UNITED STATES PATENT OFFICE.

MYRTIL KAHN AND ANTON OSSENBECK, OF ELBERFELD, GERMANY, ASSIGNORS TO FARBENFABRIKEN VORM. FRIEDR. BAYER & CO., OF ELBERFELD, GERMANY, A CORPORATION OF GERMANY.

BLUE AZO DYES.

1,078,926. Specification of Letters Patent. Patented Nov. 18, 1913.

No Drawing. Application filed April 1, 1913. Serial No. 758,208.

*To all whom it may concern:*

Be it known that we, MYRTIL KAHN and ANTON OSSENBECK, doctors of philosophy, chemists, citizens of the German Empire, residing at Elberfeld, Germany, have invented new and useful Improvements in Blue Azo Dyes, of which the following is a specification.

We have found that new and valuable cotton dyes can be obtained by combining two molecules of a diazotized acidyl-paraphenylenediamin sulfonic acid with one molecule of the 5.5-dioxy-2.2-dinaphthylamin-7.7-disulfonic acid of the formula:

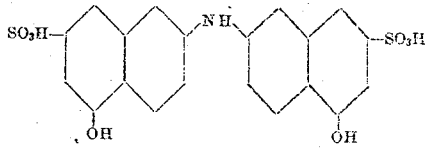

splitting off the acidyl radicals, tetrazotizing and coupling the resulting tetrazo compounds with an azodye-stuff component, such as resorcin, a meta-diamin, meta-aminophenor or their derivatives.

The new products dye cotton generally blue bright shades. The colors can be developed on the fiber with diazotized paranitranilin, black fast shades being obtained. They are after being dried and pulverized in the shape of their alkaline salts dark powders soluble in water and in concentrated sulfuric acid generally with a blue coloration; yielding upon reduction with stannous chlorid and hydrochloric acid paraphenylenediamin-sulfonic acid, 6.6. diamino-5.5-dioxy-2.2-dinaphthylamin-7.7-disulfonic acid and an amin.

In order to illustrate the new process more fully the following example is given, the parts being by weight:—52 parts of oxalyl-para-phenylenediamin-sulfonic acid are diazotized with 60 parts of concentrated hydrochloric acid (1.16 specific gravity) and 13.8 parts of nitrite. The diazo solution is then added to a solution cooled to zero of 50.5 parts of the 5.5-dioxy-2.2-dinaphthylamin-7.7-disulfonic acid (sodium salt) in 1000 parts of water and 42 parts of calcined soda. The mixture is stirred during 1 to 2 hours, heated to 90° C. and kept at this temperature during half an hour after the addition of 300 parts of a 33 per cent. caustic soda lye. Subsequently the mixture is neutralized with HCl and the dye is salted out and filtered off. It is then stirred up with 1500 parts of water, rendered slightly alkaline with caustic soda lye, cooled to 10° C., acidulated with 60 parts of hydrochloric acid, 13.8 parts of sodium nitrite are added and stirred during 6 hours. The mixture thus obtained is introduced into a solution of 22 parts of meta-phenylenediamin in 1000 parts of water containing 60 parts of calcined sodium carbonate. The mixture is heated to 60–70° C. and the dye is salted out and filtered off. It is after being dried and pulverized in the shape of its sodium salt a brownish-black powder soluble in water with a blue coloration, soluble in concentrated sulfuric acid (66° Bé.) with a greenish-blue coloration. Upon treatment with stannous chlorid and hydrochloric acid it is split up, the 6.6-diamino-5.5-dioxy-2.2-dinaphthylamin-7.7-disulfonic acid, para-phenylenediamin-sulfonic acid and triaminobenzene are obtained. It dyes cotton direct blue, after treatment with diazotized para-nitranilin black shades, and has in a free state most probably the formula:

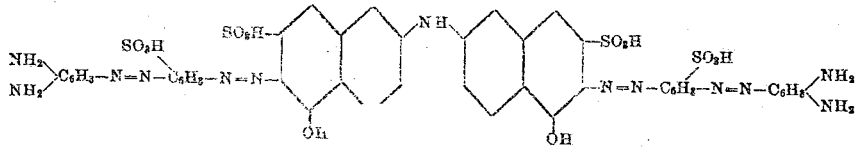

Instead of meta-phenylenediamin other components, such as resorcin, meta-aminophenol, etc., can be used.

We claim:—

1. The herein described new dyestuffs derived from the 5.5-dioxy-2.2-dinaphthylamin-7.7-disulfonic acid, para-phenylenediamin-sulfonic acid and an azo dyestuff component, which dyes are after being dried and pulverized in the shape of their alkaline salts dark powders soluble in water and in concentrated sulfuric acid generally with a blue coloration; yielding upon reduction with stannous chlorid and hydrochloric acid para-phenylenediamin-sulfonic acid, 6.6-diamino-5.5-dioxy-2.2-dinaphthylamin - 7.7-disulfonic acid and an amin; and dyeing cotton generally blue bright, after treatment with diazotized para-nitranilin black shades, substantially as described.

2. The herein described new dyestuff having in a free state most probably the formula:

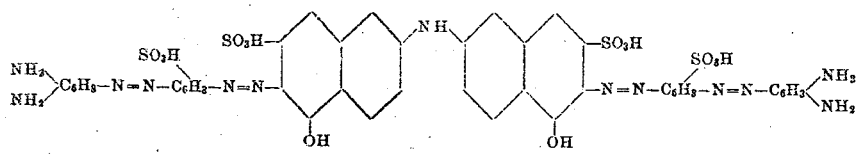

which is after being dried and pulverized in the shape of its sodium salt a brownish-black powder soluble in water with a blue and in concentrated sulfuric acid (66° Bé.) with a greenish-blue coloration; yielding upon treatment with stannous chlorid and hydrochloric acid 6.6-diamino-5.5-dioxy-2.2-dinaphthylamin-7.7-disulfonic acid, para-phenylenediamin-sulfonic acid and triaminobenzene; and dyeing cotton blue, after treatment with diazotized para-nitranilin black shades, substantially as described.

In testimony whereof we have hereunto set our hands in the presence of two subscribing witnesses.

MYRTIL KAHN. [L. S.]
ANTON OSSENBECK. [L. S.]

Witnesses:
HELEN NUFER,
DORA NUFER.